(No Model.)
E. A. BIECHELY.
CHEESE KETTLE.
No. 391,937. Patented Oct. 30, 1888.
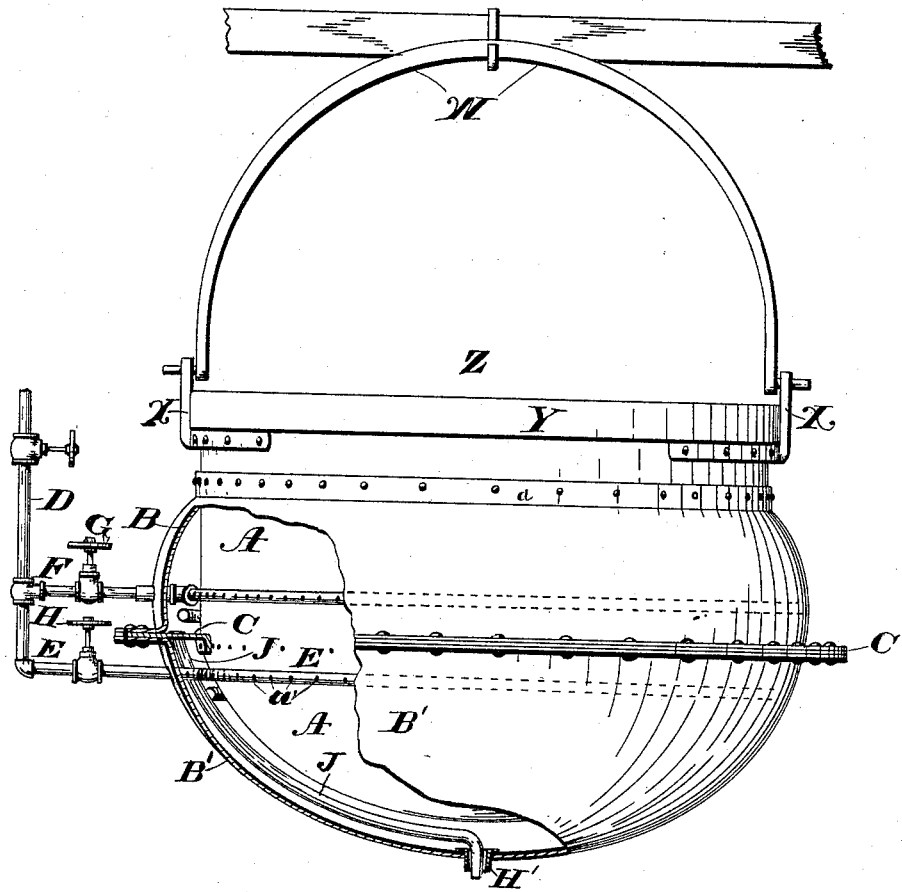
WITNESSES:
INVENTOR,
Edward A. Biechely.
By
ATTORNEY.

UNITED STATES PATENT OFFICE.

EDWARD A. BIECHELY, OF CANTON, OHIO.

CHEESE-KETTLE.

SPECIFICATION forming part of Letters Patent No. 391,937, dated October 30, 1888.

Application filed July 9, 1888. Serial No. 279,404. (No model.)

*To all whom it may concern:*

Be it known that I, EDWARD A. BIECHELY, a citizen of the United States, and a resident of Canton, county of Stark, State of Ohio, have invented a new and useful Improvement in Cheese-Kettles, of which the following is a full, clear, and exact description, reference being had to the accompanying drawing, making part of this specification.

My invention relates to improvements in cheese-kettles, the object of which is to provide means for more thoroughly and evenly heating the contents of the kettle and to maintain an even degree of temperature, as well as means by which the degree of temperature may be varied by an increase of steam thrown about the bottom or top portion of the kettle, as occasion may require.

With these ends in view my invention consists of the hereinafter-described construction of kettle, and of the details and combination of parts, as set forth in the claims, the same being illustrated in the accompanying drawing, the single figure of which shows a side elevation of the kettle and connected parts, a portion of the outer shell of the kettle being broken away.

Z represents the kettle proper, which may be made of any suitable metal, preferably of sheet-copper; A, the inner wall or receptacle, having about its upper portion a metal band or rim, Y, to stiffen and support that portion of the kettle, to which portion, and about diametrically opposite, are secured ears, as X, perforated at their upper portion for the reception of the ends of the supporting-bail W. The jacket is formed of two sections, B B', the upper portion, B, secured about the receptacle, as shown at $a$, and projected outwardly and downwardly to a dividing flange or partition, C, that encircles the receptacle and is projected therefrom, as shown, forming a division between the upper portion of the jacket B, which surrounds the upper portion of the receptacle, and the lower portion, B', which is secured to the flange C and upper portion, B, and surrounds the sides and bottom, as shown in the drawing, being spaced out from the body of the receptacle by the flange C, forming a jacket of two compartments separated by the division-flange C.

To heat the kettle and its contents, a conduit or pipe, as D, is provided to convey steam from a steam-generator (not shown and no part of my invention) to the compartments formed about the receptacle by the jacket B and B' and the division C, said pipe D being provided with branches E and F and shut-off valves G and H. That portion of the pipe E F inside of the jacket B B' is perforated, as shown, and coiled about the receptacle, the ends being closed and resting near the point of entrance E below and F above the partition flange C.

At the lowermost point of the jacket B' there is provided a drip-pipe, H', to conduct the water and steam from the space between the jacket and receptacle below the partition C, and a pipe, J, to conduct the steam and water from the space above the said partition down through the lower space and out through the pipe H', as is shown in the drawing, from which point the water and steam may be conducted to any desired point by a single pipe.

By opening the valve H steam will be admitted into the pipe E and carried about the receptacle, escaping through the perforations $a'$ into the space between the jacket and receptacle, the water formed by the condensing of the steam flowing out through the pipe H'. This pipe alone may be used a length of time to raise the temperature of the milk or other contents of the receptacle to a given degree, when the operation of heating may be quickened by the introduction of steam into the pipe F, by which it will be distributed about that portion of the receptacle above the portion C, the water formed by the condensation of the steam passing out through the pipe J, down through the space below the partition, and out through the pipe H'.

By alternately using the pipes E and F, as before stated, the degree of heat may be varied at the bottom or top of the contents of the receptacle, thereby producing desirable results not hitherto attained by former methods of heating.

Having thus fully described the nature and stated the object of my invention, what I claim, and desire to secure by Letters Patent, is—

1. In a kettle, the combination, with a receptacle and a jacket surrounding a portion of the receptacle and spaced therefrom and having compartments, of perforated upper and lower steam-conduits surrounding the receptacle within the jacket, and drip-pipes leading from beneath each of the steam-conduits, substantially as described, and for the purpose set forth.

2. In a kettle, the combination, with a receptacle and a jacket surrounding a portion of the receptacle and spaced therefrom, of a partition separating the space between the jacket and receptacle into upper and lower compartments, perforated steam-conduits surrounding the receptacle within the jacket in both upper and lower compartments, and drip-pipes leading from both compartments, substantially as described, and for the purpose set forth.

3. In a kettle, the combination, with a receptacle and a two-part jacket surrounding the sides and bottom of the receptacle, of a partition surrounding the receptacle and separating the space between the jacket and receptacle into upper and lower compartments, the outer edge of the partition being held in place between the meeting edges of the two-part jacket, substantially as described, and for the purpose set forth.

In testimony whereof I have hereunto set my hand this 28th day of June, A. D. 1888.

EDWARD A. BIECHELY.

Witnesses:
W. K. MILLER,
CHAS. N. MILLER.